(12) United States Patent
Davis

(10) Patent No.: US 7,553,419 B2
(45) Date of Patent: Jun. 30, 2009

(54) METHOD OF MATERIAL PROCESSING TO PRODUCE A FIBER PRODUCT

(75) Inventor: Russell V. Davis, Walla Walla, WA (US)

(73) Assignee: Organix, Inc., Walla Walla, WA (US)

( * ) Notice: Subject to any disclaimer, the term of this patent is extended or adjusted under 35 U.S.C. 154(b) by 433 days.

(21) Appl. No.: 11/416,902

(22) Filed: May 3, 2006

(65) Prior Publication Data

US 2007/0256463 A1 Nov. 8, 2007

(51) Int. Cl.
*C02F 3/00* (2006.01)
(52) U.S. Cl. ................... 210/609; 210/768; 210/770; 210/772
(58) Field of Classification Search ................ 210/768, 210/770, 772, 609
See application file for complete search history.

(56) References Cited

U.S. PATENT DOCUMENTS

| 4,380,496 A * | 4/1983 | Maffet ................... 210/780 |
| 4,997,578 A * | 3/1991 | Berggren ................. 210/770 |
| 5,461,843 A | 10/1995 | Garvin et al. |
| 5,566,532 A | 10/1996 | Inman et al. |
| 5,602,071 A * | 2/1997 | Summers et al. ........... 502/401 |
| 5,724,793 A | 3/1998 | Inman et al. |
| 5,738,703 A * | 4/1998 | Bandurski .................... 71/9 |
| 6,062,004 A | 5/2000 | Inman et al. |
| 6,062,044 A * | 5/2000 | Bernard et al. ............ 62/654 |
| 6,202,389 B1 | 3/2001 | Inman et al. |
| 2003/0141245 A1* | 7/2003 | Fetterman et al. .......... 210/609 |
| 2005/0035058 A1 | 2/2005 | Forrestal et al. |
| 2005/0103708 A1 | 5/2005 | Fetterman et al. |
| 2005/0106715 A1 | 5/2005 | Niv et al. |
| 2006/0150495 A1* | 7/2006 | MacConnell ............... 047/59 |

FOREIGN PATENT DOCUMENTS

DE 2610971 * 9/1977

* cited by examiner

*Primary Examiner*—Chester T Barry
(74) *Attorney, Agent, or Firm*—Robert L. Shaver; Dykes, Shaver & Nipper, LLP

(57) ABSTRACT

A material processing method produces a fiber product by anaerobic digesting of input material such as dairy flush to produce a gas product and a liquid and solid fiber product, by thereafter separating liquid components and solid fiber components of the liquid and solid fiber product, and by thereafter aerobic conditioning of the solid fiber components to derive the fiber product useful as a soil amendment in the manner of peat moss.

26 Claims, 3 Drawing Sheets

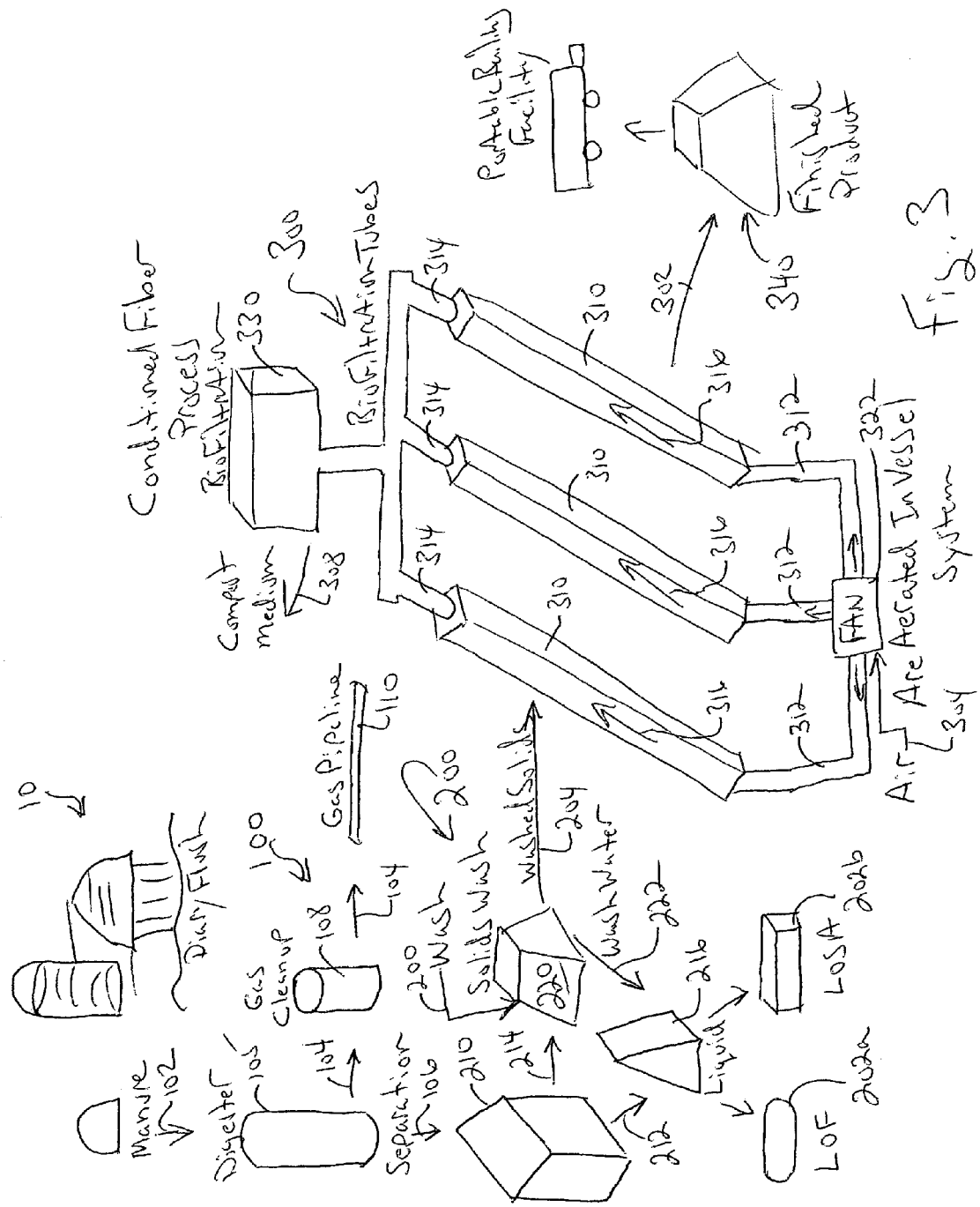

METHOD OF MATERIAL PROCESSING TO PRODUCE A FIBER PRODUCT

BACKGROUND

Peat moss is a highly utilized soil amendment. Its ability to hold moisture and provide the horticulture industry with a safe, reliable growth medium is well known. The peat moss industry has grown to large-scale annual sales and can be found in most landscape supply stores, home improvement stores, garden centers and nursery supply wholesalers. In spite of all the success, the peat moss industry faces substantial challenges possibly redefining the industry.

Peat is mined from large plots of land commonly identified as peat bogs. Many of these bogs are located in southern Canada and extend into the hundreds of thousands of acres. There is no immediate shortage of peat. There are, however, external pressures creating tension in the peat industry. Peat bogs comprise specific ecological segment of the wetland habitat—supporting insects, amphibians, plant life and more. Bogs are inherently wet and must be drained for harvest. Once drained, the ecology of a bog is lost. New bogs can grow in about 40 years, but replacing an ancient bog, e.g., 10,000 years old, is simply not possible. It may well be that peat moss bog will be protected areas.

Peat mining is sensitive to harsh and wet weather. Heavy rains can affect and even halt mining operations until the weather has turned. In a particularly wet season, the entire industry can experience a shortage of peat and associated increase in price. This can present nurseries and suppliers with few options, e.g., little choice in finding an alternative to peat.

The price of fuel has and will likely continue to increase and for any business in the transportation of materials, e.g., peat, a significant financial impact results. Since most peat is harvested some distance from its site of use, e.g., most of North America's peat moss comes from Canada, shipments have to be sent long distances sometimes traveling over 2,000 miles to their final destination. This not only creates financial pressure, but also increased truck traffic that could best be served by more local markets.

Unfortunately, heretofore there simply has not been a satisfactory replacement for peat moss. The subject mater of the present disclosure addresses such concern.

The dairy and cattle industry has as it primary products milk and meat necessary to such production, especially in the dairy industry, large amounts of animal waste, i.e., manure, result as a byproduct. Management of the manure byproduct must address environmental concerns as such cannot be simply discharged into the environment.

In recent years, manure byproducts have provided an energy source. More particularly, methane is a primary component of fresh manure. Interest in capturing this methane for use in renewable power projects has driven new manure processing technologies and facilities. These facilities, known collectively as anaerobic digesters, process manure through a storage system ranging from four to 30 days processing time depending on the technology used. Generally, bacteria inside the system break down organic matter in the absence of air to produce methane as a primary product of the digesting process. In addition, digesters produce liquid and solid fiber as byproducts.

Further processing and use of such digester byproducts have not yet found a broad spectrum of commercial value, however the subject of embodiments of the present invention contribute to a spectrum of such commercial value, especially the fiber component thereof.

SUMMARY

A material processing method produces a fiber product by digesting of input material, in some embodiments a dairy flush input material, and thereafter separating liquid components and solid fiber components and aerobic conditioning the solid fiber components to derive the fiber product useful as a soil amendment in the manner of peat moss.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIGS. 1, 2, and 3 illustrates schematically first, second, and third, respectively, embodiments of the present invention.

EMBODIMENTS OF THE PRESENT INVENTION

First Embodiment

Figure 1:
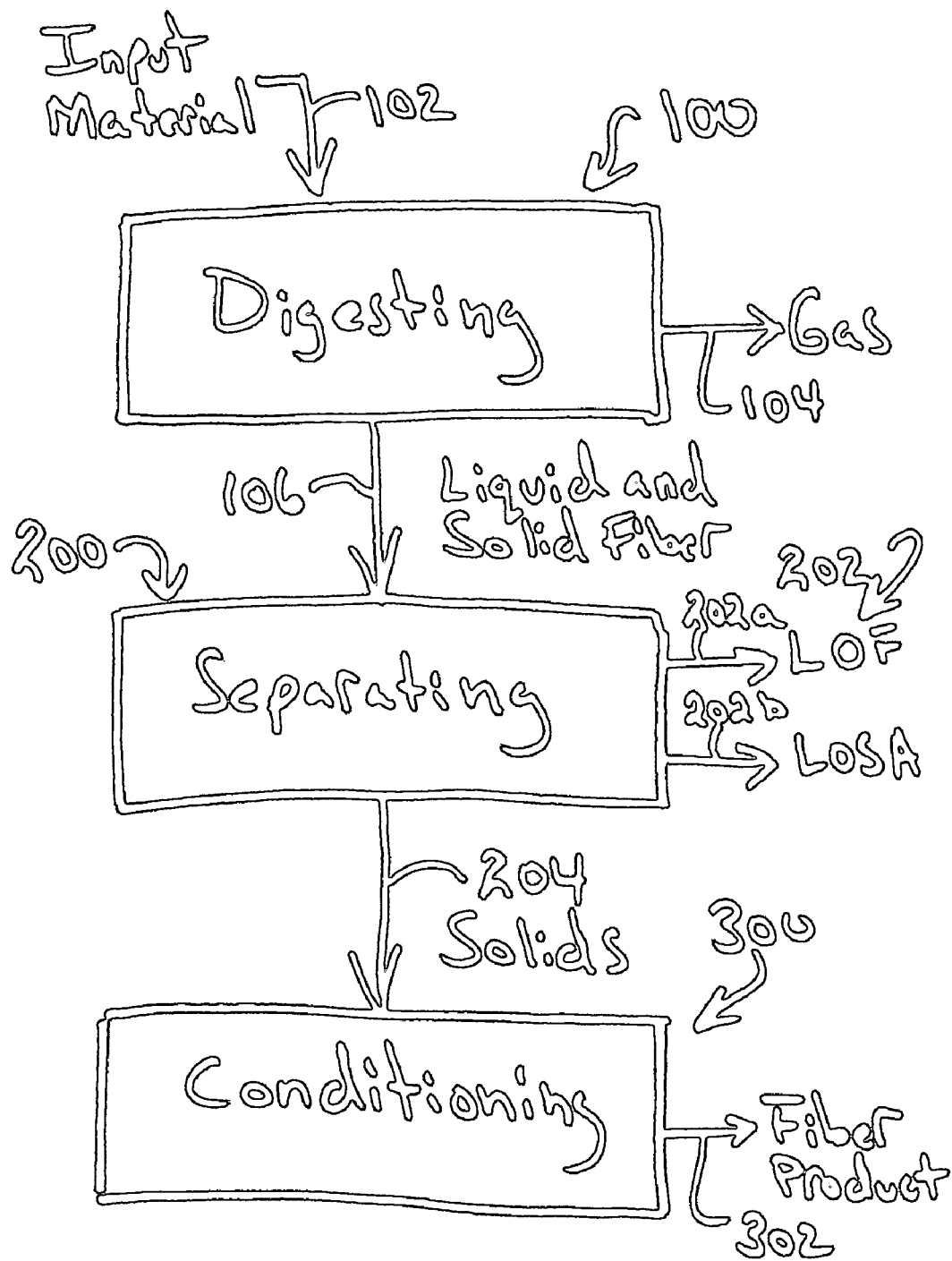

FIG. 1 illustrates a first embodiment of the present invention including, generally, a digesting process 100, a separating process 200 and a conditioning process 300. In FIG. 1, a fibrous input material 102 is applied to digesting process 100 to produce a gas product 104 and a liquid and solid fiber product 106. As used herein, the term "digested" shall refer to such industrial process. The liquid and solid fiber product 106 is then applied to separating process 200. Generally, separating process 200 divides the liquid and the solid fiber components of liquid solid fiber product 106. More particularly, process 200 produces a liquid product 202, e.g., which may be embodied as an organic fertilizer (LOF) product 202a and/or a liquid organic soil amendment (LOSA) product 202b. Residual components, primarily fibrous in character, pass from process 200 as solids 204. Solids 204 are then applied to conditioning process 300 and, after sufficient time interval, process 300 produces a fiber product 302.

While various useful byproducts are produced, e.g., gas product 104 and liquid product 202, the overall process, including digesting, separating, and conditioning, is directed toward production of fiber product 302. Fiber product 302 is intended to have similar use in agricultural applications as peat moss. In other words, fiber product 302 is used not so much for its nutrient value but for its structural or material contribution, e.g., porosity, as a soil amendment. Thus, the overall process may strip many nutritional components of the resulting product and may include adjustment to the material along the process to make it more suitable as, for example, a peat moss type of soil amendment.

Second Embodiment

Figure 2:
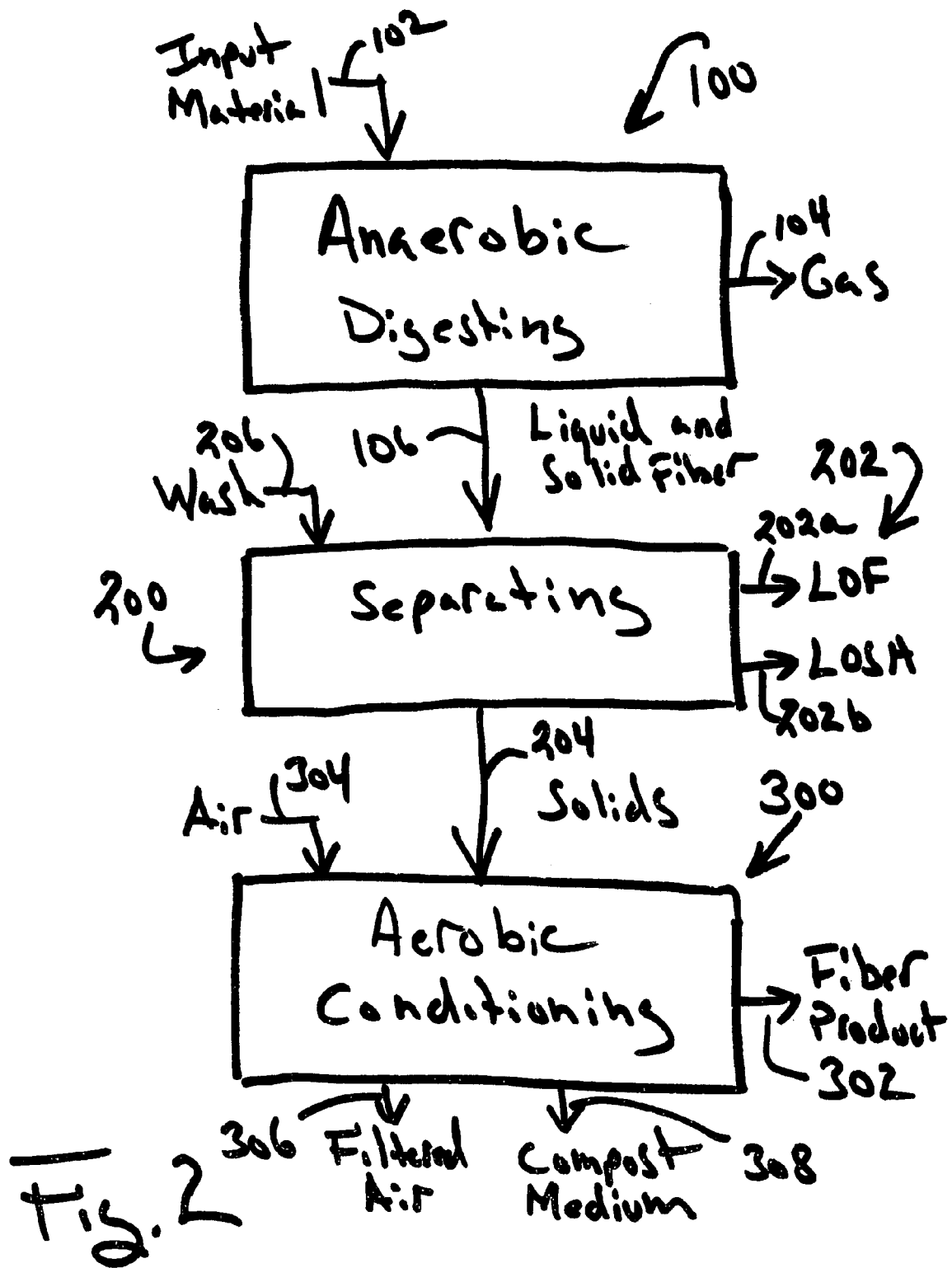

FIG. 2 illustrates a second embodiment of the present invention. In FIG. 2, digesting process 100 receives manure as input material 102 for application to an anaerobic digester. Process 100 can be conducted in a generally conventional manner including a gas cleanup and gas capture or piping to produce methane as a primary gas product 104. As will be appreciated, such a digesting process substantially sterilizes the resulting liquid and solid fiber product produced thereby. In this aspect, embodiments of the present invention desirably accept liquid and solid fiber product 106 for further processing relative to a known gas-producing process having no further use therefor.

In the separating process 200, the solid fiber, e.g., as taken in combination with liquids, from digester, is isolated. Initial separation can be mechanical and can utilize, but need not be limited to, rollers, gravity, screw press, or squeeze separation technology. Such post digester separation removes much of the liquid from the solids and the resulting solid material is a primary component applied to subsequent processing steps directed at production of fiber product 302.

According to some embodiments of the present invention, the separation process 200 desirably takes place within a "staging area" containing emissions, e.g., through a negative air biofiltration system surrounding the staging area, and thereby keeping harmful emissions from entering the atmosphere.

According to some embodiments of the present invention separation process 200 can further isolate the fiber components of liquid and solid fiber product 106. In other words, mechanical separation such as by pressing or squeezing liquid from product 106 may leave residual components undesirable in the final product 302. Accordingly, some embodiments of the present invention contemplate a rinsing or washing step in the separation process to further isolate fiber components. Thus, in FIG. 2 process 200 receives as input a wash 206. In such washing, a water based rinse washes the remaining unwanted liquids and volatile solids away from the fiber components to prepare the fiber for it's next phase, e.g., the conditioning process 300. This washing process, according to some embodiments of the present invention, can introduce several adjustments to the resulting solids 204 including a decrease in the amount of volatile nutrients in the solid fiber, a decrease in the salt level in the solid fiber, an adjustment in the carbon to nitrogen ratio to, for example, approximately 25:1 for better subsequent aerobic treatment and, a downward adjustment in the pH level. The rinsing process may also take place within the "staging area" to contain emissions through, for example, a negative air biofiltration system.

The resulting washed solids 204 are applied to an aerobic conditioning process 300 wherein the solids 204 are placed in one or more container structures. Aerobic conditioning process 300 receives as input an air source 304 injected into the storage containers. For example, when placing the solids 204 into the container structure, a vented pipe may be placed within the mass of solids 204 and the air source 304 applied to the vented pipe. This creates an aerobic condition with the storage container and further brings, e.g., conditions, solids 204 for use as fiber product 302.

According to some embodiments of the present invention, the storage containers capture air vented from the storage containers for application to a bio filters. In such case, process 300 produces as output filtered air 306. In some cases, the bio filters may be subsequently used as a compost medium 308 taken as output from process 300.

Following sufficient exposure the aerobic conditions established in conditioning process 300, the solids 204 transform into fiber product 302. Having been stripped of many volatile nutrients and salts, adjusted to a selected carbon to nitrogen ratio and to a selected pH level, the fiber product 302 possesses selected characteristics desirable for use as a soil amendment in the fashion of a peat moss soil amendment.

Third Embodiment

FIG. 3 illustrates a third embodiment of the present invention including generally digesting process 100, separating process 200, and conditioning process 300. In FIG. 3, for efficiency it is contemplated that the overall process described take place at or in the vicinity of a dairy 10. Dairy flush, e.g., manure as taken from the dairy operation and carried by water flush, applies as input material 102 to an anaerobic digester 105. Digester 105 may be a conventional digester producing gas product 104 and including a gas-cleanup process 108 applied ultimately to a gas pipeline 110.

The liquid and solid fiber product 106 is removed from the digester and applied to the separation process 200. Separation process 200 can include an initial mechanical separation process 210 such as by rollers, gravity, screw press, rotation, or other known separation technology. Such post digester mechanical separation process 210 removes much of the liquid 212 from the intermediate solids 214 and the resulting intermediate solids 214 are substantially fibrous in content. Liquid 212 may be then applied to a liquid processing step 216. Separation process 200 can take place within a "staging area" to contain and capture emissions through a negative air bio-filtration system surrounding the staging area, thereby keeping harmful emissions from entering the atmosphere.

In addition to simply pressing or squeezing liquid 212 from product 106, certain embodiments of the present invention propose additionally rinsing or washing intermediate solids 214. Thus, after the mechanical separation process 210 the intermediate solids 214 are applied to a solids wash process 220. In wash process 220, a water based rinse input 206 washes remaining liquids 222 away from the remaining fiber to better prepare the fiber for its next phase of conditioning. Wash process 220 may make selected adjustments to the resulting washed solids product 204 including but not limited to material; 1) decreasing the amount of volatile nutrients in the solids 204, 2) decreasing the salt level in washed solids 204, 3) bringing the carbon to nitrogen ratio in washed solids 204 close to, for example, 25:1 for better aerobic treatment and 4) adjusting downward to a selected magnitude the pH is adjusted downward. The rinsing process may also take place within a "staging area" containing and capturing emissions through a negative air bio-filtration system.

Liquid processing step 216 receives liquid 212 from the mechanical separating process 210 and wash water 22 from the solids wash process 220. In liquid processing step 216, a variety of nutritional components may be captured according to a variety of methods to produce, for example, liquid organic fertilizer (LOF) 202a and liquid organic soil amendment (LOSA) 202b.

While not specifically illustrated in FIG. 3, it will be understood that the mechanical separation process 210 and the solids wash process 220 may be intermingled, e.g., need not be sequential. For example, liquid and solid fiber product 106 may be subject to rinsing at entry into the separating process 200 to wash away liquid components thereof and better isolate fiber components thereof prior to mechanical separation process 210. Furthermore, mechanical separation process 210 and solids wash process 220 may be iterated as desired or necessary to produce washed solids product 204 at, for example, selected salt level, nutrient level, pH level and carbon to nitrogen ratio.

As schematically illustrated in FIG. 3, conditioning process 300 receives, e.g., by conveyor washed solids 204 for storage in bag storage structures 310. While a variety of storage and aeration method may be used, under this particular embodiment elongate bag structures are contemplated. A considerable technology has developed around such storage devices including, but not limited to the following U.S. patents, the disclosure of which is herewith incorporated by reference: U.S. Pat. No. 6,062,004 issued May 6, 2000 and entitled METHOD AND DEVICE FOR PROVIDING COMPOST BAGGING MACHINE WITH PERFORATED CONDUIT; U.S. Pat. No. 5,724,793 issued Mar. 10, 1998 and entitled MATERIALS BAGGER AND SYSTEM; U.S. Pat. No. 5,566,532 issued Oct. 22, 1996 and entitled BAGGER FOR ORGANIC MATERIAL; U.S. Pat.No. 5,461,843 issued Oct. 31, 1995 and entitled METHOD FOR TREATMENT OF BAGGED ORGANIC MATERIALS; and U.S. Pat. No. 6,202,389 issued Mar. 20, 2001 and entitled BAGGING MACHINE. It will be understood that a number of additional disclosures may be found under related patents and documentation associated with the above-noted disclosures.

Under this embodiment, bag-loading equipment (not shown in FIG. 3) works much like a sausage stuffer pushing washed solids 204 into large bags that can be either 5 foot or 10 feet across and approximately 200 feet in length. Simultaneously with the placing of washed solids 204 into the bags, the loading equipment un-reels a vented aeration pipe 312 to lie underneath the washed solids 204 and within the bag.

While schematically illustrated in FIG. 3, it will be understood that each bag 310 includes vent ports (not shown) coupled to conduits 314 to capture air 316 forced through the bag and out the vent ports. For example, each bag 310 may have approximately 12 vent ports along its length. Thus, once a bag 310 is full, the bag is sealed and a fan 322 located outside the bag is connected to the vented aeration pipes 312 located in the bag. Fan 322 thereby delivers fresh air 304 into and along the length of the bags 310 to assist in moisture control, temperature control, oxygen demand, pH adjustment and carbon dioxide release. Fan 312 may operate on a variable timing system or sensor feedback responsive to the state of the washed solids 204 within bags 310.

Emissions released during processes 300 and captured at the vent ports and conduits 314 are applied to a bio-filtration unit 330 to minimize gases released into the atmosphere. For example, known bag systems having open vent ports, may be modified to couple the vent ports to a 3" hose as conduits 314. Conduits 314 may be routed either on top or under the ground adjacent to the bags 310 to the emissions collection manifold 332. Manifold 332 then routes the emissions to the bio filtration unit 330 for scrubbing of the emissions from the bags during the conditioning process. Conditioning process 300 time is expected to be around 30 days including, for example, daily monitoring of moisture levels, temperature, emissions, etc.

According to certain embodiments of the present invention, filters once used in the bio-filtration unit 330 may be used as a compost medium Once the fiber product 302 has been aerobically conditioned, e.g., for approximately 30 days, the bag 310 is cut and the fiber product 302 is removed from the bag 310, e.g., via a loader, and taken to a post conditioning area 340. At this point the fiber product 302 may be screened and then either; 1) baled to await bailed shipment; or 2) staged as bulk material to await bulk shipment. Bales may range in size from one to fifty-five cubic feet.

As will be appreciated, fiber product 302 is a high value product as compared to compost products. Minimal real estate area is required to produce fiber product 302, estimated to be approximately 12% of that needed for compost production. Bags 310 may be recycled. Washed solids 204 during conditioning process 300 need not be handled as compared to frequent handling of material during composting operations.

The final fiber product 302 may be adjusted to contain minimal salt, e.g., with Ece: <2.5. Overall, a compared to composting operations, less transport of material, less equipment, less labor, less processing time. Quality control over the final product 302 is easily maintained according to embodiments of the present invention with no leachate or runoff and with negligible gas and volatile emissions. Processing is generally weather resistant, e.g., tolerates a spectrum of weather conditions. Washed solids 204 as placed in bags 32 have substantially reduced pathogen and weed seed content. Final process is a short 30-day process with no windrowing equipment, labor or maintenance.

Fiber product 302 provides answers to the growing challenges facing the peat moss industry and its customers. Fiber product 302 is a soil amendment solution that the U.S. horticultural industry has been waiting for. It is a true peat moss replacement having undergone a life similar to one spent in a peat bog, but in a much shorter time. The primary component of fiber product 302, digested dairy manure, is processed through an anaerobic digester. Anaerobic digesters are the latest in a movement in the US energy market to discover ways of decreasing dependence on foreign oil and are most commonly located on a dairy farm. These digesters operate in a liquid saturated environment, void of oxygen like a peat bog.

Fiber product 302 is derived from a residual; it is not a virgin material mined from the earth. It is a by-product of the dairy industry and, when processed correctly, is a veritable twin of peat moss. It is believed that little practical or discernable distinction exists between mined peat and fiber product 302.

Fiber product 302 is a direct result of proactive residuals management from large dairy operations that are part of the renewable energy movement. Every cubic foot of fiber product 302 is a direct result of renewable energy production in the form of biogas. Facilities producing fiber product 302 can be among the most complete methods for capturing and utilizing dairy residuals ever devised. Such facilities are in-vessel processing facilities. In other words, unlike conventional peat mining, the facility is not affected by rain, storms and snow. Anaerobic digesters produce biogas 365 days of the year, so input material is always available. Thus, weather cannot delay the production of fiber product 302. Such facilities are locatable at multiple, large dairy operations found in a variety of regions and this reduces significantly transportation distance and cost for delivering raw materials.

Fiber product 302 can be competitively priced with peat moss. Manufacturing costs are considerably lower than outdoor bog mining, harvesting, packaging and transport. Fiber product 302 can meet or exceed characteristics of peat moss. Thus, in addition to looking, feeling and smelling like peat, fiber product 302 can be more pH neutral than peat moss (7.0 vs. 4.5); have low salt content and as a result low electrical conductivity; have excellent porosity and water holding capacity; enjoy cationic exchange ability comparable to mined peat; and have bulk density (weight) similar to that of peat.

For dairies faced with a myriad of issues surrounding waste management, fiber product 302 and its associated method of manufacture answers many of the challenges facing dairies and can turn many of these liabilities into assets. For example, in-vessel separation and conditioning contains all odors following digestion. Collected emissions may be passed through a bio-filter for volatile capture and conversion. Since all gases are captured, ammonia emissions are captured as well and managed by the bio-filter. As the EPA puts more pressure on dairies to mange emission, embodiments of the present invention provide a viable solution to emissions capture and treatment. Virtually all of the available fiber is contained in the conditioning step, making runoff a non-issue. Containment makes it virtually impossible for the processing fiber to release any leachate into the ground. Since all digested fiber is maintained in-vessel, there are minimal issues surrounding particulate generated during processing. Embodiments of the present invention take up less than one-fourth the space required for windrow composting. In addition, the site preparation is not extensive, requiring only that the area be flat. Since there is minimal environmental impact, permit requirements are reduced and more easily satisfied. It is estimated that the cost of operations of an embodiment of the present invention is about one-half the cost of a traditional compost facility. Cost savings are realized by way of fuel savings, e.g., less on farm transport due to the smaller footprint; labor savings, e.g., less personnel needed to operate facility; maintenance reduction, e.g., it is estimated that the cost of maintenance of a facility is about one-fourth the cost of a compost site; and equipment savings, e.g., less on site transport and therefore fewer tractors and the like.

Thus, fiber product 302 is a high value product and its associated method of manufacture presents significant environmental and commercial advantages.

While use of a water-based rinse has been described herein, other compositions may be used to achieve intended characteristics of the fiber product 302. For example, additional wash input 206 ingredients may include carbonic acid via a carbon dioxide infusion as a means to manage pH levels in the fiber product 302.

It will be appreciated that the present invention is not restricted to the particular embodiments that have been described and illustrated, and that variations may be made therein without departing from the scope of the invention as found in the appended claims and equivalents thereof.

What is claimed is:

1. A method of material processing to produce a fiber product comprising:
   receiving an input material;
   applying said input material to a first process, said first process producing a gas product and a liquid and solid fiber product;
   applying said liquid and solid fiber product to a second process, said second process separating liquid components and solid fiber components of said liquid and solid fiber product, said second process comprising downward adjustment in at least one of salt, pH, and nutrient level, and wherein said carbon to nitrogen level is adjusted to a desired ratio; and
   applying said solid fiber components to a third process including storage of said solid fiber components for selected time period to derive the fiber product.

2. A method of material processing according to claim 1 wherein said input material comprises dairy manure flush.

3. A method of material processing according to claim 1 wherein said first process is an anaerobic digesting process and said gas product is methane gas.

4. A method of material processing according to claim 1 wherein said second process comprises a mechanical separation step.

5. A method of material processing according to claim 4 wherein said mechanical separation step comprises at least one of rolling, gravity influence, screw pressing, rotating, and squeezing said liquid and solid fiber product.

6. A method of material processing according to claim 5 wherein said second process further comprises a rinsing step introducing a water-based rinse to separate said liquid components from said solid components.

7. A method of material processing according to claim 1 wherein said adjustment is accomplished at least in part by introducing a water-based rinse into said second process.

8. A method of material processing according to claim 1 wherein said third process comprises storage of said solid fiber components in an aerated vented container.

9. A method of material processing according to claim 8 wherein emissions from said vented container are captured and applied to a filtration step.

10. A method of material processing according to claim 8 wherein said vented container comprises an elongate bag container.

11. A method of material processing according to claim 10 wherein said elongate bag container includes along its length a vented conduit receiving said air and releasing said air into said solid fiber components as stored therein.

12. A method of material processing according to claim 11 wherein said bag comprises vent ports and conduits attached thereto to collect said air following passage through said solid fiber components as stored therein.

13. A method of material processing according to claim 12 wherein said conduit couples to a bio-filtration unit to filter said air as taken from said vent ports.

14. A method of material processing to produce a fiber product comprising:
   receiving an input material;
   applying said input material to a first process, said first process producing a gas product and a liquid and solid fiber product;
   applying said liquid and solid fiber product to a second process, said second process separating liquid components and solid fiber components of said liquid and solid fiber product; and
   applying said solid fiber components to a third process including storage of said solid fiber components for selected time period to derive the fiber product, wherein said third process comprises storage of said solid fiber components in an aerated vented container, and wherein emissions from said vented container are captured and applied to a filtration step.

15. A method of material processing according to claim 14 wherein said input material comprises dairy manure flush.

16. A method of material processing according to claim 14 wherein said first process is an anaerobic digesting process and said gas product is methane gas.

17. A method of material processing according to claim 14 wherein said second process comprises a mechanical separation step.

18. A method of material processing according to claim 17 wherein said mechanical separation step comprises at least one of rolling, gravity influence, screw pressing, rotating, and squeezing said liquid and solid fiber product.

19. A method of material processing according to claim 18 wherein said second process further comprises a rinsing step introducing a water-based rinse to separate said liquid components from said solid components.

20. A method of material processing according to claim 14 wherein said second process comprises downward adjustment in at least one of salt, pH, and nutrient level.

21. A method of material processing according to claim 20 wherein said adjustment is accomplished at least in part by introducing a water-based rinse into said second process.

22. A method of material processing according to claim 20 wherein said carbon to nitrogen level is adjusted to a desired ratio.

23. A method of material processing according to claim 14 wherein said vented container comprises an elongate bag container.

24. A method of material processing according to claim 23 wherein said elongate bag container includes along its length a vented conduit receiving said air and releasing said air into said solid fiber components as stored therein.

25. A method of material processing according to claim 24 wherein said bag comprises vent ports and conduits attached thereto to collect said air following passage through said solid fiber components as stored therein.

26. A method of material processing according to claim 25 wherein said conduit couples to a bio-filtration unit to filter said air as taken from said vent ports.

* * * * *